April 30, 1974 A. SCHAUER 3,808,109

METHOD OF PRODUCING PURE ALPHA TANTALUM FILMS BY CATHODE SPUTTERING

Filed March 7, 1972 2 Sheets-Sheet 1

United States Patent Office 3,808,109
Patented Apr. 30, 1974

3,808,109

METHOD OF PRODUCING PURE ALPHA TANTALUM FILMS BY CATHODE SPUTTERING

Alois Schauer, Gruenwald, Germany, assignor to Siemens Aktiengesellschaft, Berlin and Munich, Germany Filed Mar. 7, 1972, Ser. No. 232,373
Claims priority, application Germany, Mar. 8, 1971, P 21 10 987.5
Int. Cl. C23f *17/00*
U.S. Cl. 204—38 A 9 Claims

ABSTRACT OF THE DISCLOSURE

A method of producing thin films of tantalum in the α-phase body-centered cubic lattice by cathode sputtering to provide exceptionally pure and low-resistive films. Tantalum is sputterd in a ring-discharge plasma that allows sputtering at relatively low noble-gas pressures and is deposited onto a substrate surface coated with $Ta_2O_5$. The partial pressure of reactive gases is kept below $10^{-6}$ torr. The maintenance of this purity condition is facilitated by the use of a large-surface anode within the sputtering apparatus since tantalum that is deposited on the anode getters the reactive gases. Tantalum films produced by the invention have a specific resistance of about 25 μΩ cm. and a temperature coefficient of resistance of about +1600 p.p.m./° C. so as to be particularly useful as initial films in thin-film electronic circuits.

BACKGROUND OF THE INVENTION

Field of the invention

The invention relates to production of tantalum films and more particularly to production of extremely pure thin films of tantalum in the α-phase body-centered cubic lattice by cathode sputtering.

Prior art

In the production of thin-layered electronic circuits, tantalum is often utilized as a layer-forming material. Generally, such layers are produced by cathode sputtering and by suitable selection of sputtering parameters, resistor films, conductor paths or capacitors can be produced. For example, by thermal oxidation or anodization tantalum metal is converted into nonconductive tantalum oxide that is suitable as a protective film against atmospheric conditions and/or as a capacitor dielectric.

Plasma generation required for cathode sputtering by electrodeless ring discharge is known. Generally, a coil of a few windings is placed around a vacuum chamber and operationally connected with a high-frequency energy source. The electro-magnetic field that is produced permeates the vacuum chamber and ionizes the sputtering gas. Electrode structures, such as an anode, a cathode, etc. within such a sputtering apparatus that envelop the plasma space and prevent undesired sputtering of vacuum chamber walls are known. An important advantage of cathode sputtering with a ring-discharge plasma is that sputtering is effected at a relatively low-pressure of the sputtering gas.

Sputtered tantalum is known in two different phases or forms. The usually observed form is the so-called α-tantalum, which like bulk tantalum has a body-centered cubic lattice. Since 1965, the so-called β-tantalum has been known and is characterized by a tetragonal lattice. β-tantalum has a relatively high resistivity of about 200 μΩ cm. and a temperature coefficient of resistance of ±100 p.p.m./° C. β-tantalum is produced when the pressure of the reactive residual gases in a sputtering chamber is kept low during the sputtering of tantalum.

Thin-film capacitors should meet two conditions; the material utilized as the electrodes should have low-resistance and the oxide which is utilized as a dielectric should have a high insulation resistance value. These two conditions are not met by either of the known tantalum phases. While it is true that β-tantalum oxide is useful as a dielectric, β-tantalum itself has a relatively high-resistance; similarly, α-tantalum has a relatively low-resistance but its oxide is not well suited for use as a capacitor dielectric.

Studies of prior art tantalum phases or forms have shown that relatively large amounts of reactive gases are incorporated into the metal lattice of known α-tantalum. Apparently the inclusion of such large amounts of reactive gases interferes with the formation of a suitable oxide layer.

SUMMARY OF THE INVENTION

The invention provides thin-films of exceptionally pure tantalum in the α-phase body-centered cubic lattice (b.c.c.) by sputtering tantalum in a cathode sputtering apparatus with a ring-discharge plasma that includes a noble gas (for example, argon) pressure of about $5\cdot10^{-4}$ to $5\cdot10^{-3}$ torr and a reactive gas pressure of less than $10^{-6}$ torr so that substantially no foreign gas is incorporated within the tantalum lattice. The tantalum films are deposited onto a substrate (glass) surface that is free of adsorbed foreign atoms, such as obtained by coating a substrate surface with $Ta_2O_5$.

DESCRIPTION OF THE PREFERRED EMBODIMENTS

The tantalum films produced in accordance with the principles of the invention are very pure and have substantially no foreign gas or gas atoms incorporated within the lattice thereof. Such pure tantalum layers are characterized by a low specific resistance and are exceptionally suitable as initial materials in thin-film electronic circuits. The temperature coefficient of resistance (TCR) is relatively high at about +1600 p.p.m./° C. but this is not overly detrimental when one considers that the specific resistance and the quality of the oxide formed therefrom for use as a dielectric are of great importance in thin-film capacitors. Because of the high purity of the tantalum of the invention, a high quality dielectric can be readily produced from a film thereof and may be characterized by a high breakthrough voltage, low leakage currents and good long-term behavior. Because of their low specific resistance, the tantalum films of the invention (herein designated as α'-Ta to distinguish over known α-tantalum, designated as α-Ta) are also utilizable as conductor paths, as well as resistors having low resistance value and high temperature coefficient of resistance.

Preferably, a noble gas at a pressure of about $5\cdot10^{-4}$ to $5\cdot10^{-3}$ torr is utilized for the electrodeless ring discharge sputtering process and the pressure of any reactive gas is kept below $10^{-6}$ torr. With the use of such pressure conditions, extremely pure α-tantalum (α'-Ta) film is deposited or formed on a given substrate.

In instances where a highly impure sputtering atmosphere is initially present, a pre-sputtering step is advantageously effected prior to the actual sputtering process itself. Such a pre-sputtering step lowers the pressure of any reactive gases such as $O_2$ or $N_2$ within the sputtering chamber since sputtered tantalum atoms exhibit a strong getter effect for such gas atoms. This getter effect is advantageously increased by utilizing a sputtering apparatus having a large-surface anode.

During the production of α-tantalum (α'-Ta) films in accordance with the invention, it is important that both the sputtering atmosphere and the substrate surface on which the tantalum films are being deposited be as free of any reactive gases as possible. Suitable substrates, for example, are glass substrates having at least one smooth surface thereof coated with a layer of $Ta_2O_5$. An uncoated glass surface must be extensively heat-treated (i.e., preheated) to sufficiently remove adsorbed gases that are present therein. If the proper reactive gas-free conditions are not provided, sputtered tantalum forms the β-phase thereof. Accordingly, it appears that β-tantalum is an impurity stabilized phase by the inclusion of a certain relatively small amount of foreign gas atoms within the tantalum lattice.

Figure 1:
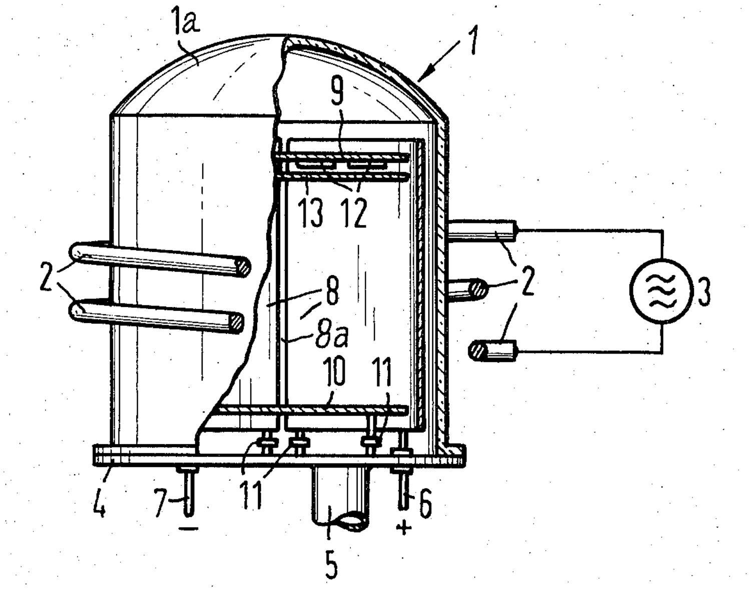
FIG. 1 is an elevational view, with parts in section, of an apparatus useful in carrying out the invention.

Referring now to FIG. 1, a cathode sputtering apparatus 1 using an electrodeless ring discharge suitable for the production of pure tantalum films (α'-Ta) in accordance with the invention is illustrated. A coil 2 is placed around a vacuum chamber 1*a* composed of an electrically non-conductive material. A high-frequency generator 3 is operationally connected to the coil 2. The electro-magnetic field that is produced around the coil 2 produces a plasma in the interior of the vacuum chamber 1*a*, the ions of which are utilized for sputtering. A base plate 4 is provided with a connection means 5 for interconnecting the vacuum chamber 1*a* with a vacuum pump (not shown). A slotted anode 8 and a cathode 10 (of tantalum) are provided with a sputtering voltage by interconnecting an electric energy source (not shown) outside the vacuum chamber 1*a* with the insulated connector means 6 and 7 respectively. The slotted anode 8 is a hollow cylinder positioned within the chamber 1*a* and has a longitudinal axial slot 8*a* therein to prevent a short circuit of the high-frequency field produced by coil 2. The slotted cylindrical anode has a relatively large surface area in comparison with the cathode surface area so that during pre-sputtering or the like, tantalum atoms getter at least some of the reactive gas atoms and the resultant tantalum compounds primarily settle on the anode surface thereby purifying the sputtering atmosphere. Insulator members 11 mechanically support anode 8 and cathode 10 within the chamber 1*a*. One or more substrates 12 that are to be coated with tantalum are arranged or mounted on a carrier plate 9, which is positioned opposite the cathode 10. A shutter 13 is positioned ahead of the substrates 12 and is activated to protect the substrates during a pre-sputtering process. Conventional means for cooling the anode and cathode or for heating the substrates have not been shown for sake of clarity, but the same are readily provided by workers in the art. In a preferred apparatus, the cathode disk 10 has a diameter of 350 mm., the anode cylinder 8 has a diameter of 360 mm. and a height of 290 mm. and the distance between the cathode and the substrates is about 280 mm.

The production of tantalum films in accordance with the invention generally comprises sputtering tantalum onto a substrate surface that is free of adsorbed foreign atoms in a cathode sputtering apparatus with a ring-discharge plasma and a sputtering atmosphere that contains a very small amount of reactive gases. Somewhat more specifically, small glass plates, such as of Corning glass 7059 or the like are coated on their free surfaces (i.e. the surfaces thereof facing the cathode) with a $Ta_2O_5$ layer. The $Ta_2O_5$ layer is generally about 800 A. (angstroms) thick and produced, for example, by thermal oxidation of a sputtered tantalum film. Such a coated substrate is properly positioned within the cathode sputtering apparatus and the substrates are then heated in a vacuum at about 300° C. to remove any residual gases that are absorbed on the coating (oxide) surface. A noble gas (such as argon) is provided within the sputtering chamber at a pressure of about $1 \cdot 10^{-3}$ torr and the partial pressure of reactive gases within the chamber is reduced to less than $1 \cdot 10^{-5}$ torr. Then, a pre-sputtering process is effected for about one and one-half hours with the shutter 13 in a blocking position in order to purify the cathode and to remove traces of reactive gases from the sputtering atmosphere. During this pre-sputtering process, the partial pressure of foreign gases decreases below the critical threshold of about $1 \cdot 10^{-6}$ torr because of the getter effect of tantalum. Then tantalum is sputtered at a voltage of 400 v. and a current of 2 A. so that a very pure α-phase tantalum (α'-Ta) film is produced on the substrate surfaces. After a 40-minute sputtering process, the tantalum film on a substrate is about 2500 A. thick.

Tantalum films produced in accordance with the invention have a sheet resistance of about 1 Ω and a specific resistance of 25 μΩ cm. The temperature coefficient of resistance is about +1600 p.p.m./° C. The lattice of such tantalum (α'-Ta) is a body-centered cubic. The high degree of purity of such tantalum layers can be concluded from the low specific resistance and high positive temperature coefficient of resistance.

Figure 2:
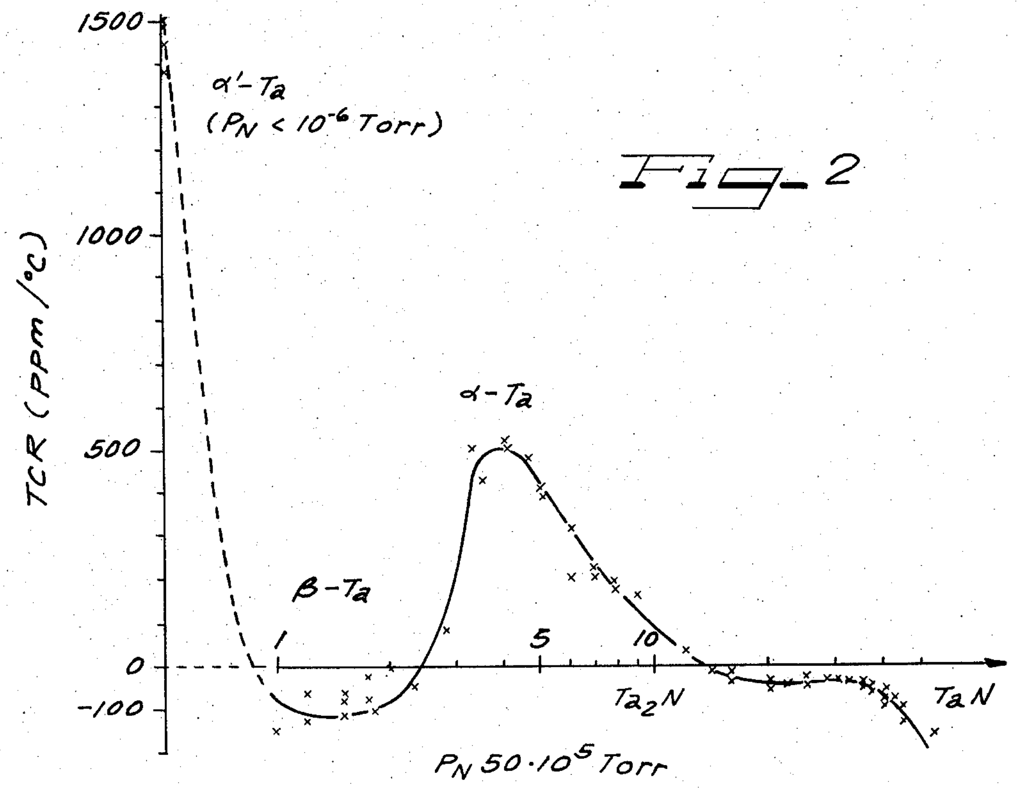
FIG. 2 is a graphic illustration showing the relation between temperature coefficient of resistance of sputtered tantalum films and nitrogen partial pressure prior to deposition.

FIG. 2 illustrates temperature coefficient of resistance (TCR) of sputtered pure tantalum films of the invention (α'-Ta), of β-tantalum films (β-Ta), of known tantalum films (α-Ta) and of certain other tantalum compounds ($Ta_2N$ and TaN) in relation to nitrogen partial pressure ($P_N$) prior to deposition. It will be noted that the α'-Ta film has a large positive coefficient of resistance of about +1600 p.p.m./° C. whereas the known α-Ta film has a temperature coefficient of resistance of about 500 p.p.m./° C. The TCR of β-Ta film is about −100 p.p.m./° C. or more.

Figure 3:
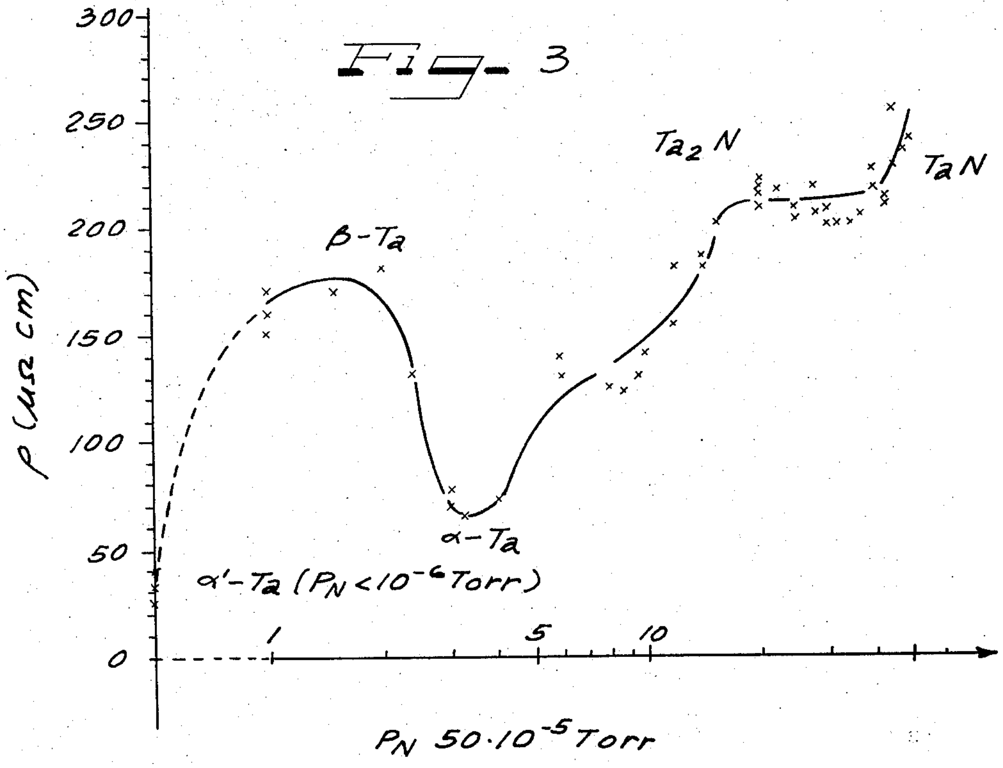
FIG. 3 is a graphic illustration showing the resistivity of sputtered tantalum films as a function of nitrogen partial pressure prior to deposition.

FIG. 3 illustrates resistivity (ρ) of sputtered α'-Ta film, β-Ta film, α-Ta film as well as $Ta_2N$ and TaN films as a function of nitrogen (N) partial pressure ($P_N$) prior to deposition. It will be noted that α'-Ta has a resistivity of about 25 μΩ cm. whereas known α-Ta has a resistivity of about 60 μΩ cm. The ρ of β-Ta film is about 180 μΩ cm. or more.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

I claim as my invention:

1. A method of producing thin films of tantalum in the α-phase body-centered cubic lattice with a cathode sputtering apparatus using an electrodeless ring discharge and having a sputtering chamber, a sputtering atmosphere which includes a noble gas and a reactive gas, a slotted cylindrical anode enveloping a plasma space within said chamber, a high frequency coil enveloping said sputtering chamber, and a cathode positioned within said chamber and intersecting the longitudinal axis of said anode, said cathode having at least its upper surface composed of tantalum, comprising:

positioning a substrate within the sputtering chamber, said substrate having an exposed smooth surface substantially free of adsorbed reactive gas atoms, said exposed surface facing said cathode;

removing reactive gas from the sputtering atmosphere so that the amount of reactive gas remaining therein has a partial pressure of less than about $10^{-6}$ torr;

sputtering tantalum with a ring-discharge plasma produced by the high frequency coil and enveloped by the slotted cylindrical anode; and depositing a thin film of tantalum in the α-phase body-centered cubic lattice on the exposed surface of said substrate.

2. A method as defined in claim 1 wherein the partial pressure of the noble gas within the sputtering atmosphere prior to deposition of the thin film of tantalum on the substrate is decreased to about $5 \cdot 10^{-4}$ to $5 \cdot 10^{-3}$ torr.

3. A method as defined in claim 1 wherein the removal of the reactive gas includes masking the substrate and pre-sputtering of tantalum whereby tantalum atoms react with reactive gas atoms and lower the partial pressure of the reactive gas in the sputtering atmosphere to less than $10^{-6}$ torr.

4. A method as defined in claim 1 wherein the removal of the reactive gas includes providing a relatively large surface for the slotted anode in relation to the surface of the cathode and pre-sputtering tantalum whereby tantalum atoms react with reactive gas atoms and are deposited on the large anode surface.

5. A method as defined in claim 1 wherein the exposed surface of the substrate is coated with a layer of $Ta_2O_5$ prior to being positioned within the sputtering chamber.

6. A method as defined in claim 1 wherein the deposited tantalum film is thermally oxidized or anodized so as to form an oxide coating thereof on the outer surface of said film.

7. A method of producing thin films of tantalum in the $\alpha$-phase body-centered cubic lattice with a cathode sputtering apparatus using an electrodeless ring discharge and having a sputtering chamber, a sputtering atmosphere which includes a noble gas and a reactive gas, a slotted cylindrical anode having a relatively large surface in comparison to the surface of a cathode, said anode enveloping a plasma space within said chamber, a cathode positioned within said chamber to intersect the longitudinal axis of said anode, said cathode having at least its upper surface composed of tantalum, a support plate positioned within said chamber and opposite said cathode, a high frequency coil enveloping said sputtering chamber, and a shutter means positioned within said chamber and between said cathode and said support plate comprising:

positioning a substrate onto the support plate, said substrate having an exposed smooth surface substantially free of adsorbed reactive gas atoms, said surface being positioned to face said cathode;

placing a noble gas at a pressure of about $1 \cdot 10^{-3}$ torr into said sputtering atmosphere;

protecting said substrate by moving said shutter means between said substrate and said cathode;

pre-sputtering for a period of time sufficient to reduce the partial pressure of the reactive gas in the sputtering atmosphere to below about $10^{-6}$ torr;

uncovering said substrate by moving said shutter means away from said substrate;

sputtering tantalum with a ring-discharge plasma produced by the high frequency coil and enveloped by the slotted cylindrical anode; and depositing a thin film of tantalum in the $\alpha$-phase body-centered cubic lattice on the uncovered exposed surface of said substrate.

8. A process as defined in claim 7 wherein the substrate is heated in a vacuum at about 300° C. for removal of any absorbed reactive gas atoms.

9. A process as defined in claim 7 wherein sputtering is effected with an electric energy source having a voltage of 400 volts and a current of 2 amperes.

References Cited

UNITED STATES PATENTS

| | | | |
|---|---|---|---|
| 3,391,071 | 7/1968 | Theverer | 204—192 |
| 3,395,089 | 7/1968 | Mayer et al. | 204—192 |

JOHN H. MACK, Primary Examiner

W. A. LANGEL, Assistant Examiner

U.S. Cl. X.R.

204—192, 298